(12) United States Patent
Tsai et al.

(10) Patent No.: US 11,182,545 B1
(45) Date of Patent: Nov. 23, 2021

(54) MACHINE LEARNING ON MIXED DATA DOCUMENTS

(71) Applicant: International Business Machines Corporation, Armonk, NY (US)

(72) Inventors: Yi-Chun Tsai, Taipei (TW); Ying-Chen Yu, Taipei (TW); June-Ray Lin, Taipei (TW); Pei-Hua Su, Kaohsiung (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/924,869

(22) Filed: Jul. 9, 2020

(51) Int. Cl.
| G06F 17/00 | (2019.01) |
| G06F 40/177 | (2020.01) |
| G06N 3/08 | (2006.01) |
| G06F 40/169 | (2020.01) |
| G06F 40/295 | (2020.01) |
| G06N 3/04 | (2006.01) |

(52) U.S. Cl.
CPC .......... *G06F 40/177* (2020.01); *G06F 40/169* (2020.01); *G06F 40/295* (2020.01); *G06N 3/0454* (2013.01); *G06N 3/08* (2013.01)

(58) Field of Classification Search
CPC .... G06F 40/177; G06F 40/295; G06F 40/169; G06N 3/08; G06N 3/0454
See application file for complete search history.

(56) References Cited

U.S. PATENT DOCUMENTS

| 8,468,445 | B2* | 6/2013 | Gupta | G06F 16/80 |
| | | | | 715/234 |
| 9,830,314 | B2 | 11/2017 | Byron | |
| 10,095,740 | B2* | 10/2018 | Bastide | G06F 16/24542 |
| 10,318,626 | B2 | 6/2019 | Guggilla et al. | |
| 10,607,042 | B1* | 3/2020 | Dasgupta | G06F 40/30 |
| 2015/0309990 | A1* | 10/2015 | Allen | G06F 16/245 |
| | | | | 704/9 |
| 2015/0331845 | A1 | 11/2015 | Guggilla et al. | |
| 2016/0117412 | A1* | 4/2016 | Mungi | G06F 40/177 |
| | | | | 707/774 |
| 2018/0082183 | A1* | 3/2018 | Hertz | G06Q 10/10 |
| 2018/0300315 | A1* | 10/2018 | Leal | G06F 40/268 |
| 2019/0114370 | A1* | 4/2019 | Cerino | G06K 9/00469 |

(Continued)

OTHER PUBLICATIONS

Anonymous, "Involuntary Revolution of Formless / Semi-Structured Document and applying different Analytics," An IP.com Prior Art Database Technical Disclosure, IP.com No. IPCOM000256074D, Nov. 2, 2018, 6 pages.

(Continued)

*Primary Examiner* — Laurie A Ries
(74) *Attorney, Agent, or Firm* — Nolan M. Lawrence

(57) ABSTRACT

A first natural language document is received. The document includes unstructured data and a first table structure that includes a plurality of first table entries. The first table structure is identified based on the document. The first table structure is extracted from the document in response to the identifying. A first machine learning output is generated based on a first machine learning model and from the document. A second machine learning output is generated based on a second machine learning model and from the first table structure. The first output of the document and the second output of the first table structure are combined.

20 Claims, 6 Drawing Sheets

(56) References Cited

U.S. PATENT DOCUMENTS

| | | |
|---|---|---|
| 2019/0251182 A1* | 8/2019 | Ray .................. G06F 40/194 |
| 2019/0266070 A1* | 8/2019 | Bhandarkar ........ G06F 11/3644 |
| 2020/0097601 A1 | 3/2020 | Han et al. |
| 2020/0133964 A1* | 4/2020 | Lee .................. G06F 16/258 |
| 2020/0320053 A1* | 10/2020 | He .................. G06F 17/18 |

OTHER PUBLICATIONS

Miller-Osborn, Jen., "New Indicators of Compromise for APT Group Nitro Uncovered", Search Unit 42, Paloalto Networks, Information Sheets, Oct. 3, 2014, 7 pages. https://unit42.paloaltonetworks.com/new-indicators-compromise-apt-group-nitro-uncovered/.

Mell et al., "The NIST Definition of Cloud Computing", Recommendations of the National Institute of Standards and Technology, Special Publication 800-145, Sep. 2011, 7 pages.

* cited by examiner

MACHINE LEARNING ON MIXED DATA DOCUMENTS

BACKGROUND

The present disclosure relates to machine learning, and more specifically, to natural language processing on mixed data documents.

Machine learning involves teaching a computer algorithm, i.e., the machine, to label or classify a data record in some way, e.g., labelling the subject of a photograph as animate or inanimate. Machine learning involves training the computer algorithm to make the classification by providing labeled examples, e.g., picture subjects (labeled as animate or not). In machine learning training, a classification task is performed repeatedly in order to gradually improve the accuracy of the classification. Machine learning may be used to process documents that are created by humans. The created documents may include unstructured data, such as text, sentences, and paragraphs. The created documents may include other information structured in a tabular form.

SUMMARY

According to embodiments, disclosed are a method, system, and computer program product. A first natural language document is received. The document includes unstructured data and a first table structure that includes a plurality of first table entries. The first table structure is identified based on the document. The first table structure is extracted from the document in response to the identifying. A first machine learning output is generated based on a first machine learning model and from the document. A second machine learning output is generated based on a second machine learning model and from the first table structure. The first output of the document and the second output of the first table structure are combined.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
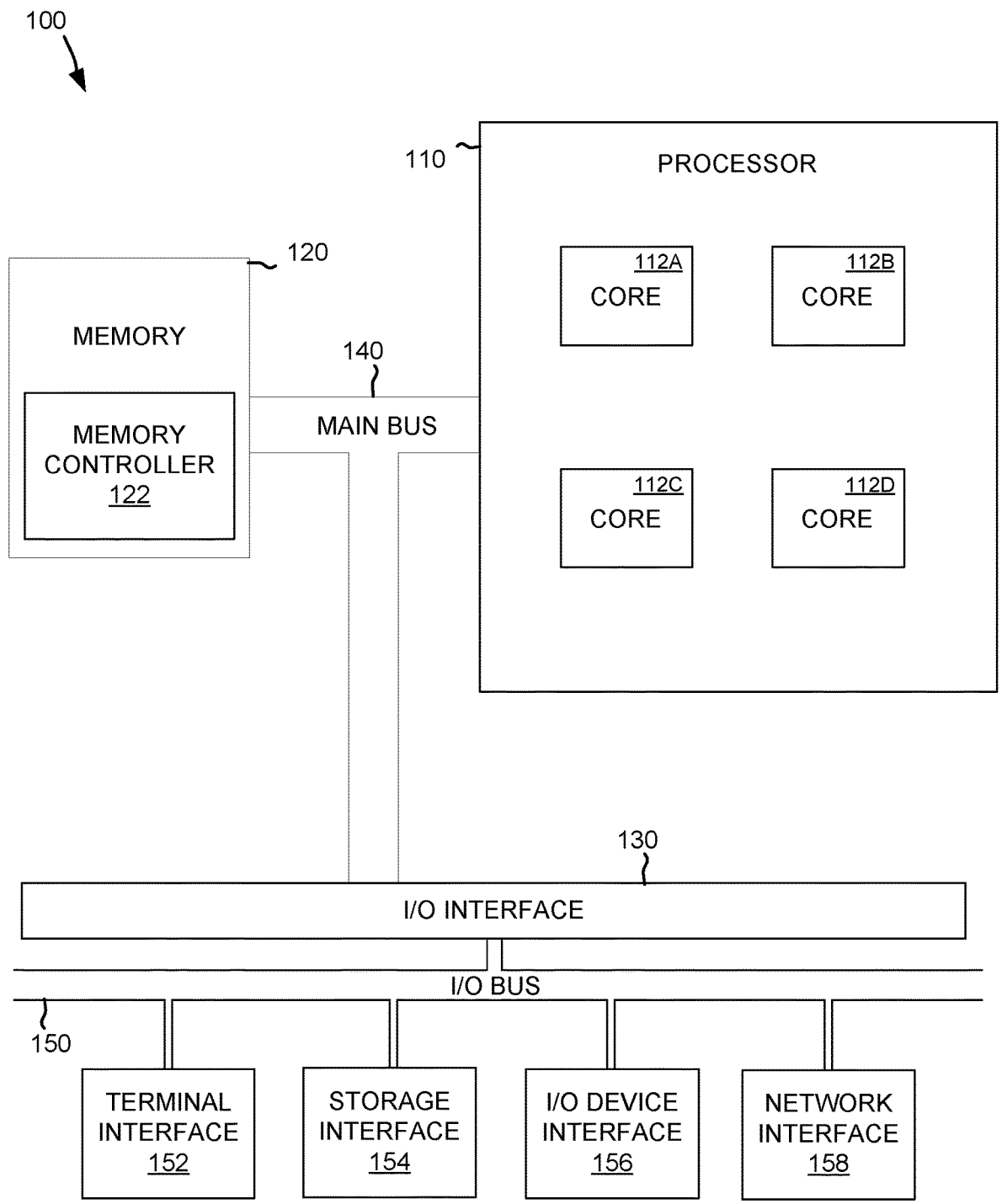
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to machine learning; more particular aspects relate to natural language processing on mixed data documents. While the present disclosure is not necessarily limited to such applications, various aspects of the disclosure may be appreciated through a discussion of various examples using this context.

Machine learning may be one or more techniques to process data. One use of machine learning is that of natural language processing. For example, IBM Watson™ may operate to determine meaning based on documents that contain natural language. Machine learning may be embodied in a machine learning model. A machine learning model may be a neural network, a natural langue processing system, a support vector machine, or other relevant computer structure configured for processing data. The machine learning model may be configured to input data in the form of text and documents, and further configured to output syntactical meaning, entity identification, relationship detection, and other features of the input.

Some documents may include natural language in the form of unstructured text or data. Unstructured text may include information that either does not have a pre-defined data model or is not organized in a pre-defined manner. The unstructured text may include words, sentences, paragraphs, and other relevant features. The natural language documents may also be processed by identifying or annotating various features of the document. For example, a document may be annotated to distinguish or otherwise identify document spans, nouns, paragraphs, transitive verbs, and the like. The machine learning model may then process the various features of the annotated document.

Some documents may include mixed data documents that include natural language data in the form of unstructured text and also in the form of table structures. Table structures may include text that is grouped, segmented, or arranged in a specific and consistent manner (e.g., rows, columns, cells). Table structures may include any of the following: tables that include rows and columns; a bulleted list; a numbered list; tabbed text; or any other relevant structured textual data. Structured data may include entities of data that are organized in and standardized in a pre-defined manner. A bulleted list or numbered list may be considered a single column structured text. Each item or entry in table may be organized in a non-natural language manner. For example, in a plurality of entries of a table, each entry may be separated by a specific non-visible character, such as a non-visible dash, comma, new-line, or other relevant character. Table structures may rely on other structures, such as, fields, forms, entries, cells, and the like.

A machine learning model may not be able to parse natural language documents of natural language and also table structures (mixed data documents). In detail, a machine learning model may be configured or trained on the typically text-heavy nature of natural language. While natural language documents do contain data such as dates, numbers, and facts, they may be surrounded by large spans of other qualifying and semi-unrelated textual data. This results in irregularities and ambiguities that make it difficult to understand without the use of the additional configuration and training of the machine learning model. The additional configuration and training of the machine learning model, however, is not designed for processing of table structures. The machine learning model may misinterpret or disassociate the various concepts, features, and data contained within the entries of a table structure that is a part of a mixed data document. For example, in one study, a machine learning model failed to accurately analyze 13% of a mixed data document. Further, the 13% of data that was not accurately analyzed accounted for a majority of the meaning of the document.

Another attempt to process mixed data documents is to augment or supplement the machine learning with one or more structure data processing techniques. The structured data processing techniques may yield some information that is extracted from a table structure. Unfortunately, the techniques of the structured data processing are often not relevant. Further, structured data techniques often output data that is in a format that loses the meaning or features that are identified by the machine learning model. Further, machine learning models may rely on resource intensive annotations of data. For example, a computer annotation process or a human may be employed to annotate natural language. The computer annotation process and the tools that assist humans to perform human annotation may be configured to perform annotation only on natural language spans. Not only can the human/computer annotation be more resource and time intensive, the annotation programs and tools may also be inaccurate and lead to further inaccuracies in performing machine learning on mixed data documents.

Multiple-model mixed-data machine-learning (MMML) may operate to overcome the weaknesses and issues related to processing mixed data documents. The MMML may operate based on two or more machine learning models to process documents. In detail, the MMML may utilize a first machine learning model (ML model) to perform the analysis and natural language processing of natural language in a given document. The document may be annotated by the MMML before being processed by the first ML model. In some embodiments, the document may be annotated by a human before the MMML performs the processing. The MMML may generate features from the natural language portion of the mixed data document. The features may include entities and relationships. The MMML may perform natural language processing on table structures of the mixed data document. In detail, the MMML may utilize a second ML model to perform the analysis and natural langue processing of the table structure of a given document. The MMML may utilize the entities and relationships of the first ML model of the MMML to annotate the table structure before the second ML model of the MMML processes the table structure.

In some embodiments, the first ML model and the second ML model of the MMML may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, a natural language processing system of the first ML model and/or the second ML model of the MMML may include various components (not depicted) operating through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from mixed data documents. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., mixed data documents). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a mixed data document at the natural language processing system, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

In some embodiments, the natural language processing system may leverage one or more of the example machine learning techniques to perform machine-learning (ML) text operations. Specifically, an MMML may operate to perform machine-learning text classification and/or a machine-learning text comparison. Machine-learning text classification may include ML text operations to convert, characters, text, words, and phrases to numerical values. The numerical values may then be input into a neural network to determine various features, characteristics, and other information of words with respect to a document or in relation to other words (e.g., to classify a numerical value associated with a word may permit the classification of a word). Machine-learning text comparison may include using the numerical values of converted characters, text, words, and phrases for performing a comparison. The comparison may be a comparison of a numerical value of a first word or other text to the numerical value of a second word or other text. The determination of the machine-learning text comparison may be to determine a scoring, a correlation, or a relevant relationship (e.g., a relationship between a first numerical value of a first word and a second numerical value of a second word). The comparison may be used to determine if two words are similar or different based on one or more criteria. The numerical operations of a machine-learning text classification/comparison may be a function of a mathematical operation performed through a neural network, such as performing a linear regression, an addition, or other relevant mathematical operation of the numerical value representative of a word or other text.

The ML text operations may include word encoding, such as one-hot encoding of words from a tokenizer, POS tagger, semantic relationship identifier, syntactic relationship identifier, and the like. The ML text operations may include the use of vectorization of text, such as the vectorization of words from a tokenizer, POS tagger, semantic relationship identifier, syntactic relationship identifier, and the like. For example, a paragraph of text may include the phrase "orange is a fruit that grows on trees." Vectorization of the word "orange" may include setting input neurons of a neural network to the various words of the phrase including the word "orange." The output value may be an array of values (e.g, forty-eight numbers, thousands of numbers). The output values may trend towards "1" for related words and may trend towards "0" for unrelated words. The related words may be related based on one or more of the following: similar parts of speech, syntactical meaning, locality within a sentence or paragraph, or other relevant "closeness" between the input and other parts of natural language (e.g., other parts of the phrase "orange is a fruit that grows on trees", other parts of a paragraph that contains the phrase, other parts of language).

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller

122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
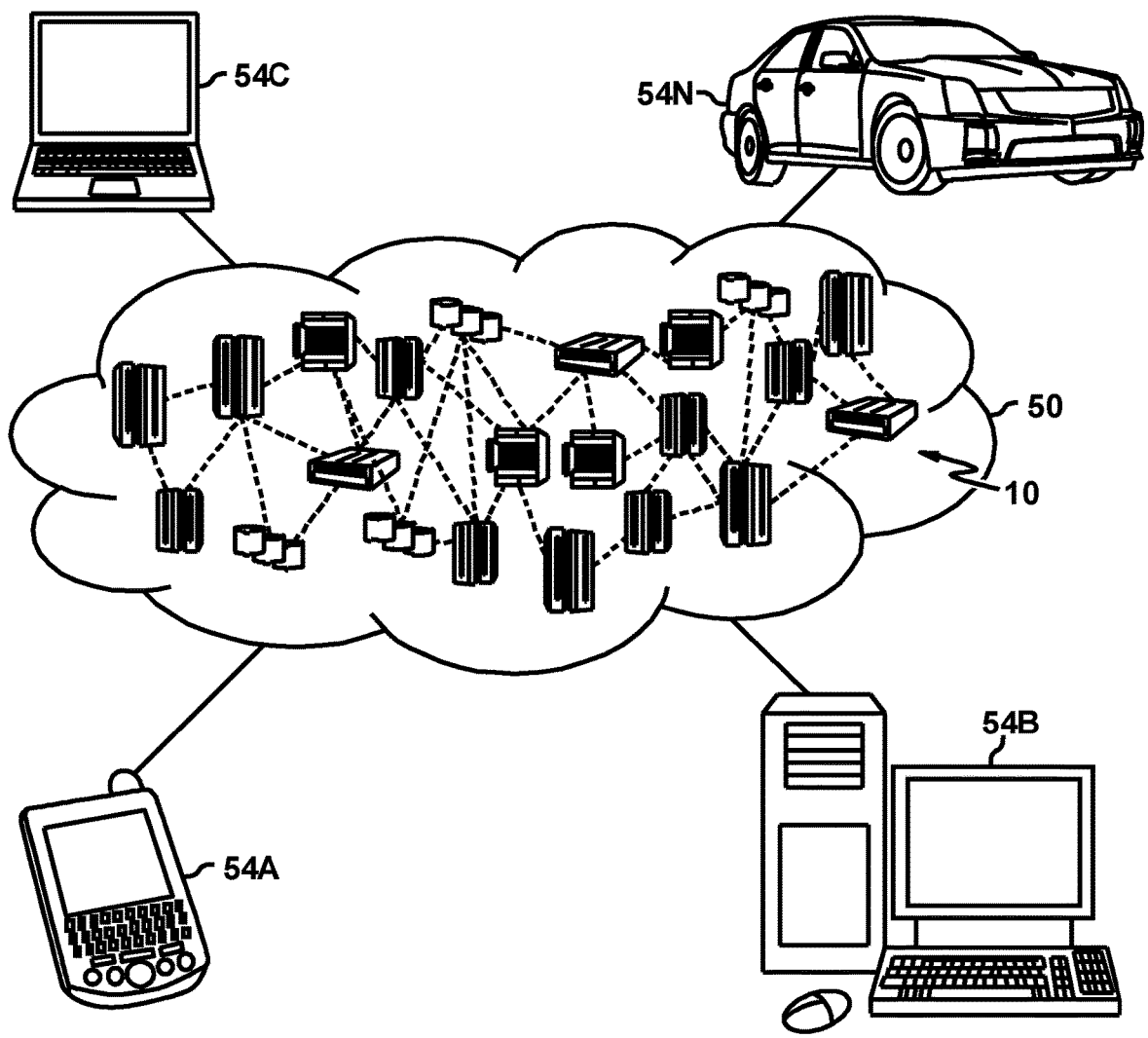
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
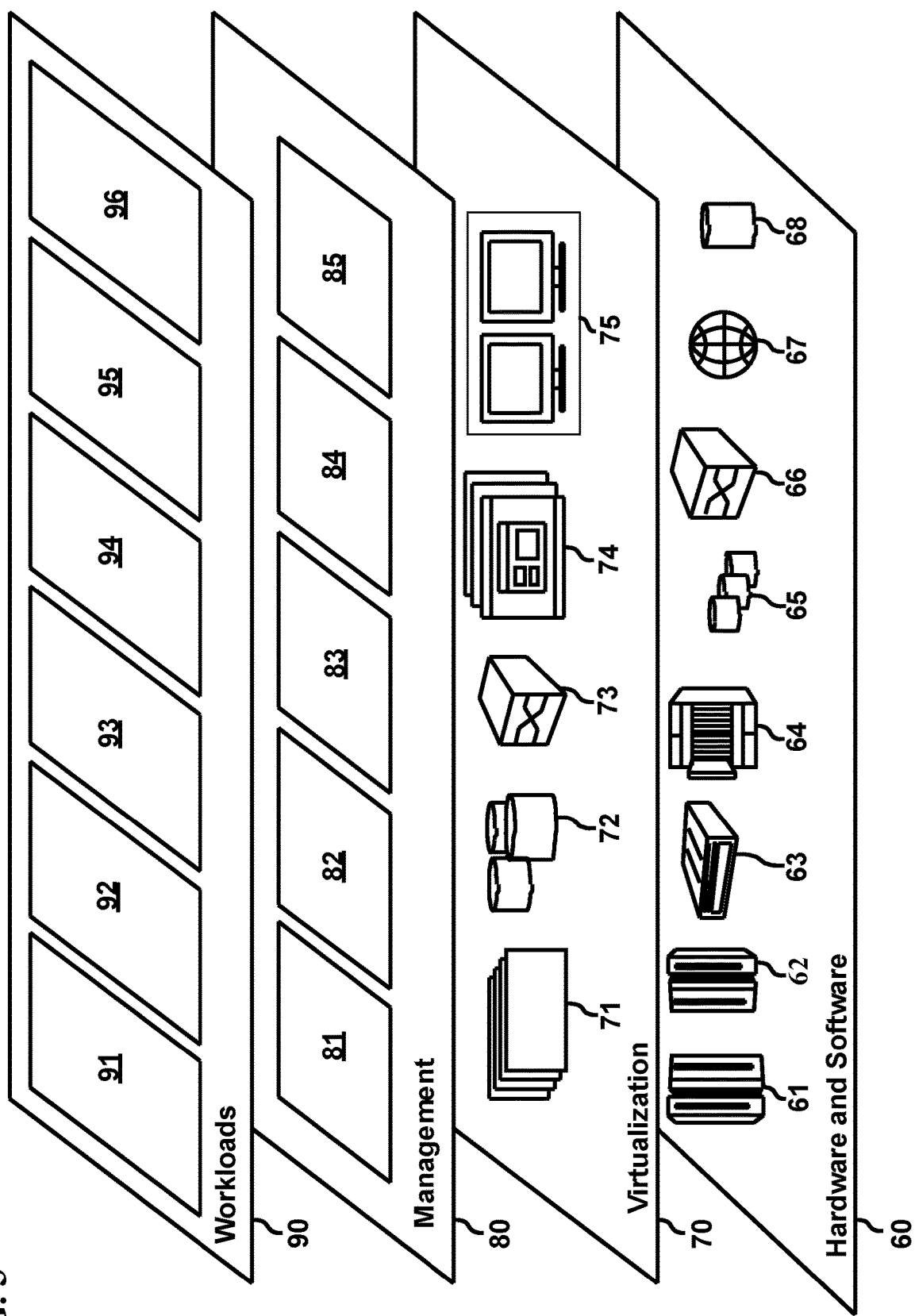
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and MMML 96. 32-60

Figure 4:
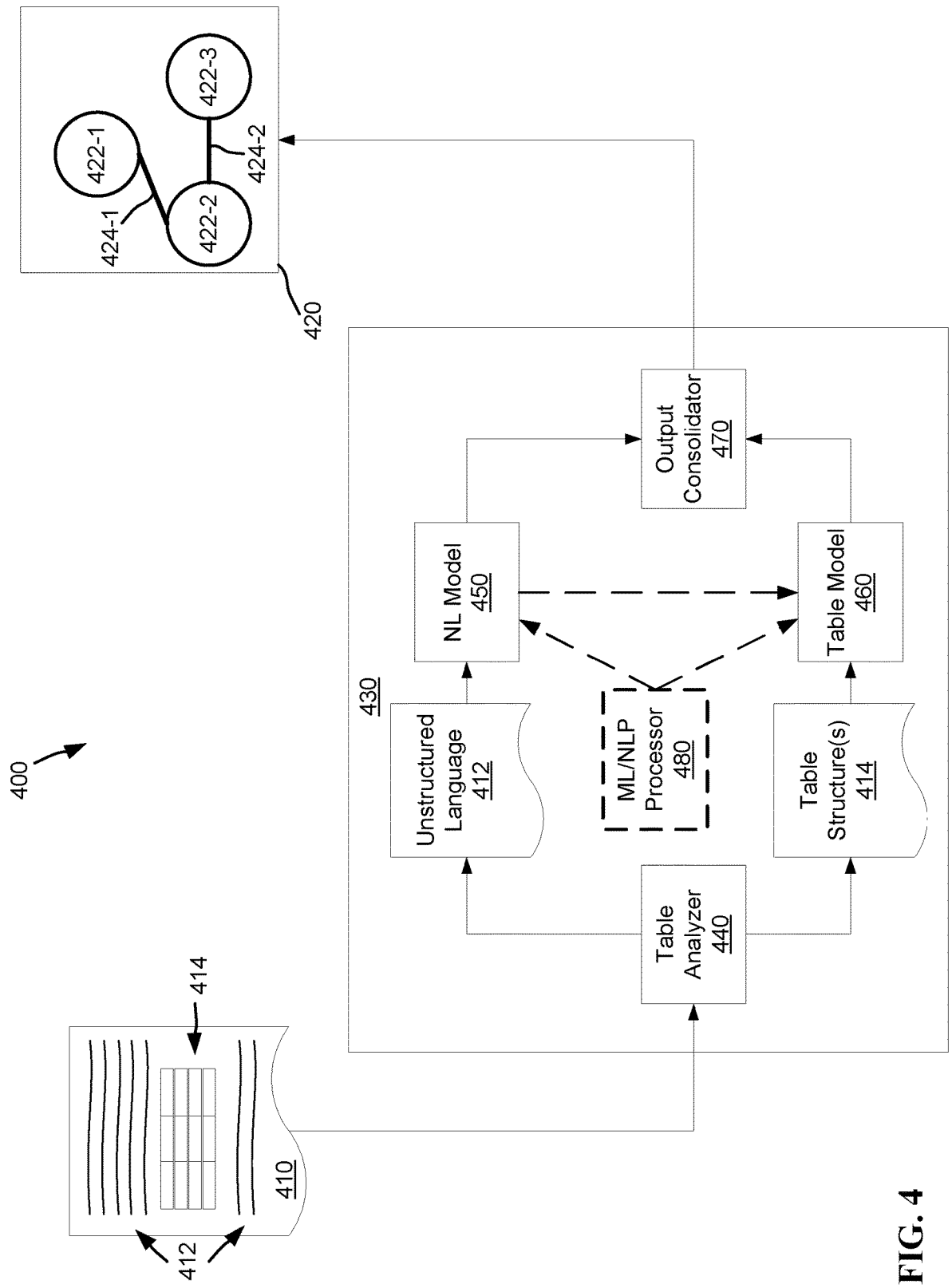
FIG. 4 depicts an example system of performing natural language processing of mixed data documents, consistent with some embodiments of the disclosure.

FIG. 4 depicts an example system 400 of performing natural language processing of mixed data documents, consistent with some embodiments of the disclosure. System 400 may be configured to operate on input 410 and generate an output 420. System 400 may include a MMML 430 for operating on the input 410. For example, MMML 430 may be configured to generate an output 420, based on input 410. MMML 430 may be a computer, such as computer system 100. In some embodiments, MMML 430 may be a part of a cloud-based system, such as cloud computing environment 50.

MMML 430 of system 400 may include a plurality of hardware and software components. For example, MMML 430 includes the following: a table analyzer 440 configured to extract table structures; a natural language model (NL model) 450 configured to output analysis of natural language; a table structure model (table model) 460 configured to output analysis of table structures; and an output consolidator 470 configured to generate a single output from the multiple outputs of the rest of the MMML 430. In some embodiments, one or more components of MMML 430 may operate based on a machine learning processor and/or based on a natural language processor 480. For example, ML/NLP processor 480 may be configured to ingest training datasets, perform annotation of training documents, and generate NL model 450 and table model 460.

Table analyzer 440 may be software, such as one or more processes and programs configured to operate on input, such as natural language documents. Table analyzer 440 may be hardware, such as one or more general purpose processors, or special purpose processing units configured to operate on input. In some embodiments, table analyzer 440 may be a combination of software and hardware, such as low-level functional programing uploaded to a field programmable gate area or re-writeable executable firmware.

Table analyzer 440 may operate on input 410. For example, input 410 may be a mixed data document that includes unstructured language 412 and table structure 414. Unstructured language 412 may include natural language, such as words, sentences, paragraphs, and the like. Table structure 414 may include structures of text, such as cells, fields, entries, bulleted list items, numbered list items, tab separated entries, and the like. Though input 410 may depict two portions of unstructured language and a singular table structure, other types of natural language documents may be processed as well. For example, MMML 430 may also be configured to operate on solely natural language documents as input 410. In another example, MMML 430 may be configured to operate on a security whitepaper that includes a summary portion (a single unstructured language portion) and a plurality of tables and bulleted lists that are related to the summary (a plurality of table structures).

Table analyzer 440 may be configured to separate any unstructured natural language and table structure. In detail, table analyzer 440 may perform natural language processing, object character recognition, feature detection, annotated document analysis, or another relevant technique to identify a table structure in any received input before further processing of MMML 430 occurs. For example, table analyzer 440 may identify in input 410 (e.g., a mixed data document) table structure 414 and unstructured language 412. Based on the identification of table structure 414, table analyzer 440 may be configured to extract table structure 414 from unstructured language 412. In some embodiments table analyzer may be configured to partition, copy, move, or otherwise separate unstructured language 412 and table structure 414 (e.g., save them into two separate documents).

Table analyzer 440 may then be configured to pass the separate unstructured language 412 and the table structure 414 to other components of MMML 430.

NL model 450 may be configured to receive unstructured language 412. In detail, NL model 450 may be a machine learning model, a neural network, a support vector machine, or other relevant machine learning processing system executed by a processor, such as processor 120. NL model 450 may be configured to generate output (e.g., entities, relationships of various entities) based on the unstructured language 412. For example, NL model 450 may receive a first document containing the unstructured language 412. NL model 450 may generate an output that is provided to output consolidator 470. NL model 450 may also provide the output to table model 460.

Table model 460 may be configured to receive one or more table structures. In detail, NL model 450 may be a second machine learning model, neural network, support vector machine, or other relevant machine learning processing system, that is executed by processor 120. Table model 460 may be configured to operate on table structures, such as table structure 414. In some embodiments, table model 460 may be configured to operate on table structures and may be based on output from NL model 450. In detail, table model 460 may perform annotation, matching, identification, or other analysis of table structure 414 to generate output. Table model 460 may use the output of NL model 450 to generate output from analysis of table structure 414. In a first example, table model 460 may analyze table structure 414 to identify a table based on a relationship identified in output of NL model 450. In a second example, table model 460 may analyze table structure 414 to identify a column or row based on an entity of output of NL model 450.

Output consolidator 470 may incorporate software, and utilize one or more processes and programs configured to generate output. Output consolidator 470 may be hardware, such as one or more general purpose processors, or special purpose processing units configured to generate output. In some embodiments, output consolidator 470 may be a combination of software and hardware, such as an application specific integrated circuit. Output consolidator 470 may be configured to combine the first machine learning output of the NL model 450 with the second machine learning output of the table model 460. Output consolidator 470 may employ analysis to aggregate, include, interleave, associate, or otherwise combine the outputs of the NL model 450 and the table model 460. Output consolidator 470 may utilize natural language processing, bubble sorting, word association, text identification, and/or another other single (or combination of) relevant computer science technique(s).

Output 420 may be a result of the output consolidator 470 of the MMML 430. For example, NL model 450 may output from unstructured language 412 a first entity 422-1, a second entity 422-2, and a relationship 424-1 between the first entity and the second entity. Table model 460 may output from structured language 414 a third entity 422-3 and a relationship 424-2. In some embodiments, table model 460 may create a relationship between entity 422-2 and entity 422-3 (i.e., relationship 424-2). In some embodiments, output consolidator 470 may append, combine, bring together, merge, concatenate, or otherwise associate entity 422-2 and 422-3 (i.e., relationship 424-2).

Figure 5:
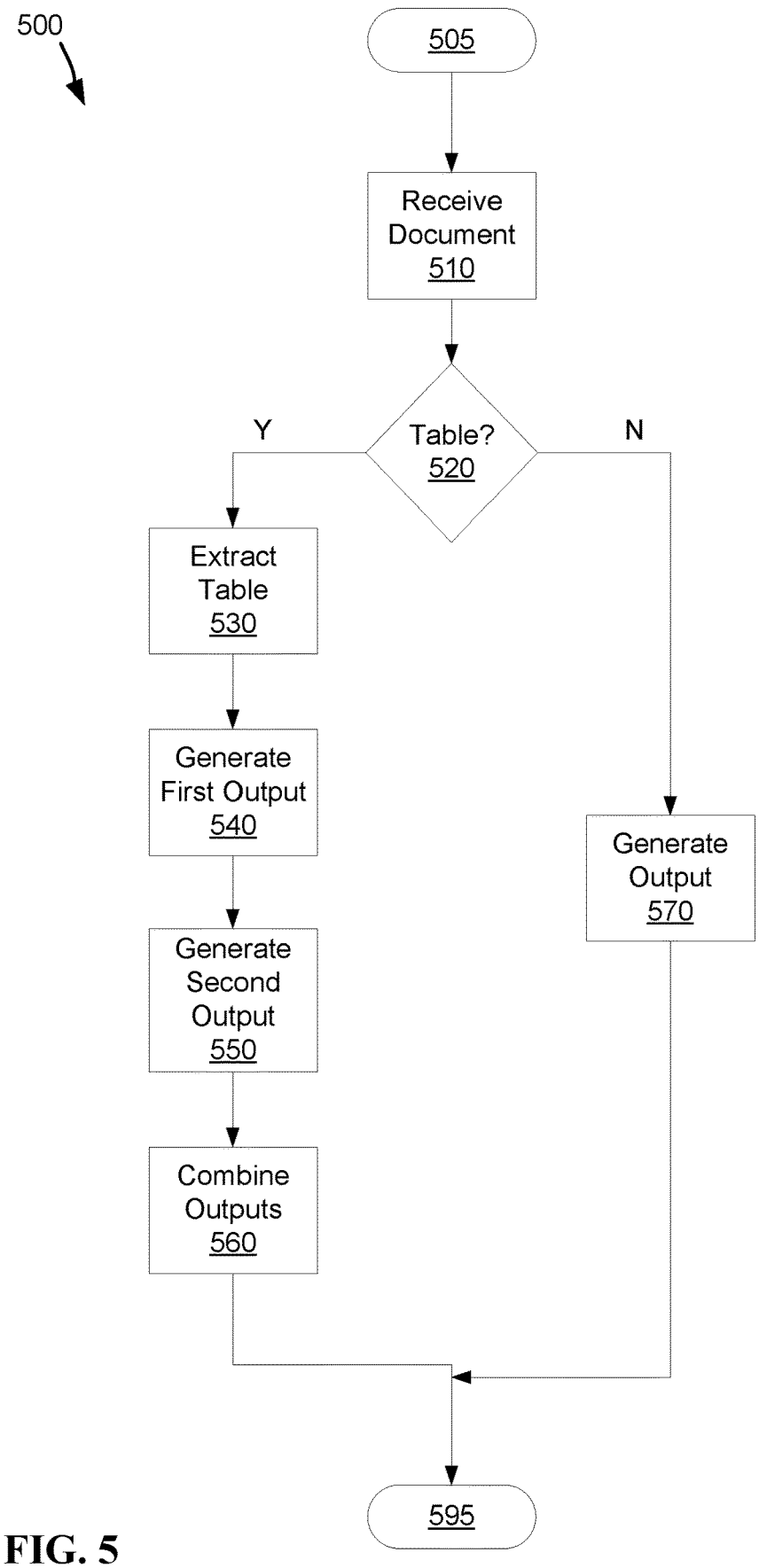
FIG. 5 depicts an example method of processing mixed data documents, consistent with some embodiments of the disclosure.

FIG. 5 depicts an example method 500 of processing mixed data documents, consistent with some embodiments of the disclosure. Method 500 may be performed by a computer, such as computer system 100. Method 500 may be performed by a portion of a cloud service, such as cloud environment 50. Method 500 may be performed by multiple-model mixed-data machine learning, such as MMML 430. Method 500 may be performed responsively, such as in response to detecting, receiving, retrieving, or otherwise obtaining, documents that contain natural language.

From start 505, one or more documents may be received at 510. The documents may be natural language documents. The documents may be mixed data documents that contain natural language portions and one or more table structures. In some embodiments, the documents may not be annotated. In some embodiments, only a natural language portion of a document may be annotated. For example, a document may be a mixed data document that contains one or more portions of natural language and one or more table structures. The portions of natural language may be annotated, such as parts of speech annotation. The table structures may not be annotated. For example, a document may be a mixed data document and no portion of a table structure may have any annotation, modification, or other analysis performed before being received at 510. If a table is not identified at 520:N, an output may be processed at 570. The output may be processed by a single machine learning model of a natural language processing system, such as NL model 450.

If a table is identified, at 520:Y, one or more table structures may be extracted at 530. The table structures may be extracted by a MMML, such as MMML 430. The table structures may be extracted by removing, culling, or otherwise separating the tables structures from the rest of the mixed data document (e.g., inserting the table structures into a second document). After being extracted at 530, the first output of a machine learning model may be performed at 540 on the mixed data document that no longer contains any table structures. For example, a mixed data document that contains only natural language portions, but has any and all table structures removed may be performed by NL model 450.

The first machine learning output, generated at 540, may include entities and relationships that convey the meaning or other features of the natural language portions of the mixed data document. At 550 a second machine learning output may be generated. The second output may be generated by a second machine learning model, such as table model 460. The second machine learning model may utilize output of the first machine learning model. For example, any entities, relationships, or other features and outputs of a first machine learning model may be fed to a second machine learning model. In some embodiments, the second machine learning model may annotate the table structures based upon the output of the first machine learning model. For example, a second machine learning model may first match, identify, and annotate one or more table structures based upon the output of the first machine learning model.

At 560, the output of the machine learning models may be combined. The machine learning model outputs may be combined by an MMML 430. For example, output consolidator 470 may use the output of a first machine learning model, generated at 540, as a frame, skeleton, outline, or first output document. The output consolidator 470 may take the output and append, combine, bring together, or match the output from the second machine learning output, generated at 550, to enhance, expand, or otherwise add to the first machine learning output. After the output is combined at 560—alternatively, after the natural language document is processed at 570—method 500 ends at 595.

Figure 6:
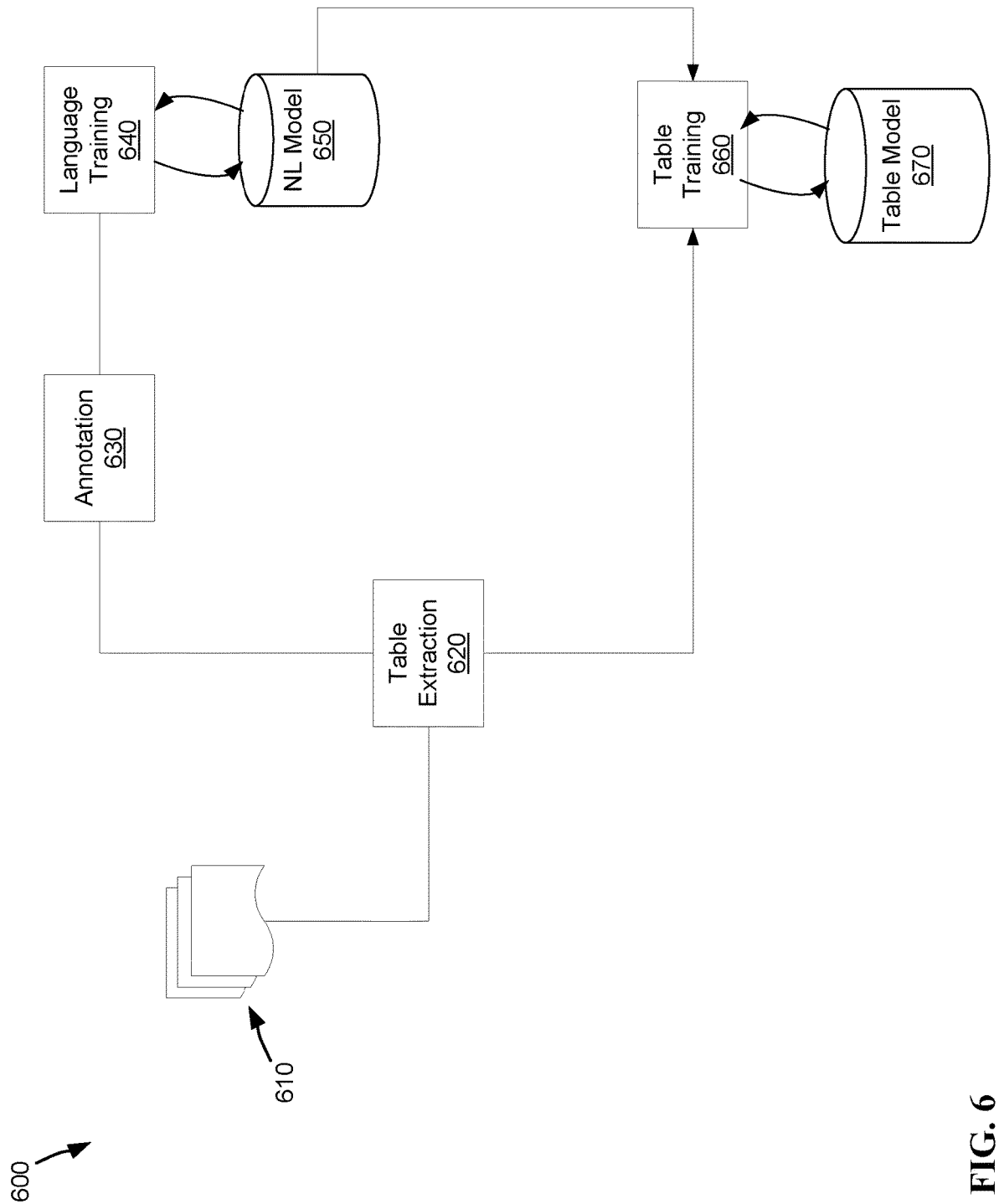
FIG. 6 a flow diagram 600 of performing training of a multiple machine learning models for mixed document analysis, consistent with some embodiments of the disclosure.

FIG. 6 a flow diagram 600 of performing training of a multiple machine learning models for mixed document analysis, consistent with some embodiments of the disclosure. Flow diagram 600 may depict the operation and movement of data through a system, or consistent with a method or computer program product having one or more program instructions consistent with embodiments of the disclosure. The operations of flow diagram 600 may be the performance of training a machine learning model based on a training set of data, such as a plurality of mixed data documents. For example, computer system 100 may perform training of models based upon documents that contain natural language and table structures. In another example, cloud environment 50 may operate by scanning for and detecting the presence of table structures in a subset of a plurality of natural language documents. The operations of flow diagram 600 may be performed by MMML 430 or another relevant configuration of a multiple-model mixed-data machine learning system consistent with embodiments.

The training operations depicted by diagram 600 may be based on a topic. For example, training may be based on the plurality of documents 610 that are related to or about the same topic of security anomalies. The plurality of documents 610 may be directed to computer viruses and other malware. Any models generated as a result of the training may then more accurately be able to analyze mixed data documents that are related to the topic of security and security anomalies. In another example, training may be based on a plurality of documents being about a topic of medical device operation. The plurality of documents 610 may be directed to various medical conditions and treatment and patient outcomes that are related to a medical device or various medical devices. Any models generated as a result of training may then more accurately be able to analyze mixed data documents that are related to the topic of medicine and medical devices.

A plurality of documents 610 may be used for training data. The plurality of documents may include one or more natural language documents that contain text, sentences, paragraphs, and other natural language spans. Some of the documents of the plurality (i.e., a subset) may also include table structures. These documents may be mixed data documents that include natural language and table structures. The table structures may include bulleted lists, numbered lists, tab or character separated entries, row and column-organized data, and other structured data.

A table extraction unit 620 may operate to remove, extract, or otherwise separate the natural language and the table structures. The table extraction unit 620 may be one or more circuits or computer programs configured to process natural language and mixed data documents. The table extraction unit 620 may operate by scanning the plurality of documents 610 to identify the subset that includes table structures. The table extraction unit 620 may operate by separating the documents into two groups. The first group may be documents from the plurality 610 that only include natural language portions and do not include any table structures. The second group may be documents from the plurality 610 that are a part of the subset that included table structures before being extracted by table extraction unit 620. The table extraction unit 620 may transfer the plurality of documents other than the subset (e.g., the documents that do not include table structures) to an annotation unit 630.

The table extraction unit 620 may separate the table structures of the second group from the natural language portions of the second group. The separation may include generation of new table-structure documents. The separation may include an insertion of a document identifier (e.g., a series of numbers, a series of alphanumeric characters) into the mixed data document and the newly created table structure document. For example, if a document from the subset includes natural language portions and one or more table structures, the table extraction unit 620 may create a new file for the table structures. The table extraction unit 620 may then place an identifier, such as "43521349087-A", into the original document that now only contains the natural language portions and no longer contains table structures. The table extraction unit 620 may then place a similar identifier, such as "43521349087-B", into the newly created table structure document. The two identifiers may then be used later to keep track of and associate the two separate documents that were originally a singular mixed data document.

An annotation engine 630 may be used to annotate that natural language portions of the documents. The annotation engine 630 may be one or more circuits or computer programs configured to process natural language and annotate parts of speech or other features of a document. The annotation engine 630 may pass the annotated documents to a natural language training (language training) unit 640. The language training unit 640 may perform one or more relevant training operations, such as neural networking, to generate and refine a natural language model (NL model) 650. The language training unit 640 may also output one or more entities and relationships as part of generating and refining the NL model 650.

The table structure documents created by the table extraction unit 620 may be sent to a table structure training (table training) unit 660. The table training unit 660 may be one or more circuits or computer programs configured to process language of a table structure. The table training unit 660 may also perform auto labeling of the table structures. Specifically, the table training unit 660 may receive unannotated table structure documents. The table training unit 660 may also receive one or more entities and relationships from the NL model 650 or the language training unit 640. The table training unit 660 may auto label relationship types of a table structure. The table training unit 660 may auto label entity types for columns of a table structure. For example, a bulleted list may be treated like a single column table and the list may be annotated by the table training unit with a relationship type from the NL model 650. The single column of the bulleted list may be annotated with the entity type from the NL model 650. The table training unit 660 may then generate table model 670 on the newly annotated table structures. The training may include performing machine learning, such as neural networking, to train table predictors with the label and table features, such as column/row names being features of a relationship. The training may also include performing machine learning, such as neural networking, to train column predictors with the column features, such as column names being features of an entity. The multiple models (e.g., NL model 650 and table model 670) may then be used by multi-model mixed-data machine learning, such as MMML 430 using the models on new mixed data documents.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
receiving a first natural language document, wherein the first natural language document includes unstructured data and a first table structure, the first table structure includes a plurality of first table entries;
identifying, based on the first natural language document, the first table structure;
extracting, in response to the identifying, the first table structure from the first natural language document and;
generating, based on a first machine learning model and from the first natural language document after the first table structure was removed from the first natural language document, a first machine learning output;
generating, based on a second machine learning model and from the first table structure, a second machine learning output; and
combining the first machine learning output of the first natural language document and the second machine learning output of the first table structure of the first natural language document.

2. The method of claim 1, wherein the plurality of first table entries is selected from the group consisting of bulleted items, numbered list items, tabular data, and structured data.

3. The method of claim 1, wherein the generating the first machine learning output is based on a plurality of annotations for the first natural language document.

4. The method of claim 1, wherein the generating the second machine learning output further comprises:
annotating, based on the first machine learning output of the natural language document and before the generating the second machine learning output, the table structure.

5. The method of claim 1, wherein creating the first machine learning model comprises:
retrieving a plurality of natural language documents, wherein a subset of the plurality of natural language documents contains a table structure;
detecting, based on the plurality of natural language documents, the table structures in the subset;
extracting, from the subset, the table structures; and
training, based on the plurality of natural language documents other than the subset and based on the subset of the plurality after the extracting, the first machine learning model.

6. The method of claim 5, wherein an output of training the first machine learning model includes entities and relationships, and wherein the method further comprises:
matching, based on the output of the first machine learning model and based on an annotation of the plurality of natural language documents, one or more entries of the extracted table structures with the entities and relationships;
annotating, based on the matching, the extracted table structures; and
training, based on the annotated extracted table structures, the second machine learning model.

7. The method of claim 1, wherein the first machine learning model is selected from the group consisting of a neural network and a support vector machine.

8. The method of claim 1, wherein the second machine learning model is selected from the group consisting of a neural network and a support vector machine.

9. A system, the system comprising:
a memory, the memory containing one or more instructions; and
a processor, the processor communicatively coupled to the memory, the processor, in response to reading the one or more instructions, configured to:
receive a first natural language document, wherein the first natural language document includes unstructured data and a first table structure, the first table structure includes a plurality of first table entries;
identify, based on the first natural language document, the first table structure;
extract, in response to the identifying, the first table structure from the first natural language document and;
generate, based on a first machine learning model and from the first natural language document after the first table structure was removed from the first natural language document, a first machine learning output;
generate, based on a second machine learning model and from the first table structure, a second machine learning output; and
combine the first machine learning output of the first natural language document and the second machine learning output of the first table structure of the first natural language document.

10. The system of claim 9, wherein the plurality of first table entries is selected from the group consisting of bulleted items, numbered list items, tabular data, and structured data.

11. The system of claim 9, wherein the generate the first machine learning output is based on a plurality of annotations for the first natural language document.

12. The system of claim 9, wherein the generate the second machine learning output further comprises:
annotate, based on the first machine learning output of the natural language document and before the generating the second machine learning output, the table structure.

13. The system of claim 9, wherein creating the first machine learning model comprises:
retrieve a plurality of natural language documents, wherein a subset of the plurality of natural language documents contains a table structure;
detect, based on the plurality of natural language documents, the table structures in the subset;
extract, from the subset, the table structures; and
train, based on the plurality of natural language documents other than the subset and based on the subset of the plurality after the extracting, the first machine learning model.

14. The system of claim 13, wherein an output of training the first machine learning model includes entities and relationships, and wherein the processor is further configured to:
match, based on the output of the first machine learning model and based on an annotation of the plurality of natural language documents, one or more entries of the extracted table structures with the entities and relationships of the output;
annotate, based on the matching, the extracted table structures; and train, based on the annotated extracted table structures, the second machine learning model.

15. A computer program product, the computer program product comprising:
one or more computer readable storage media; and
program instructions collectively stored on the one or more computer readable storage media, the program instructions configured to:
receive a first natural language document, wherein the first natural language document includes unstructured data and a first table structure, the first table structure includes a plurality of first table entries;
identify, based on the first natural language document, the first table structure;
extract, in response to the identifying, the first table structure from the first natural language document and;
generate, based on a first machine learning model and from the first natural language document after the first table structure was removed from the first natural language document, a first machine learning output;
generate, based on a second machine learning model and from the first table structure, a second machine learning output; and
combine the first machine learning output of the first natural language document and the second machine learning output of the first table structure of the first natural language document.

16. The computer program product of claim 15, wherein the plurality of first table entries is selected from the group consisting of bulleted items, numbered list items, tabular data, and structured data.

17. The computer program product of claim 15, wherein creating the first machine learning model comprises:
retrieve a plurality of natural language documents, wherein a subset of the plurality of natural language documents contains a table structure;
detect, based on the plurality of natural language documents, the table structures in the subset;
extract, from the subset, the table structures; and
train, based on the plurality of natural language documents other than the subset and based on the subset of the plurality after the extracting, the first machine learning model.

18. The computer program product of claim 17, wherein an output of training the first machine learning model includes entities and relationships, and wherein the processor is further configured to:
match, based on the output of the first machine learning model and based on an annotation of the plurality of natural language documents, one or more entries of the extracted table structures with the entities and relationships of the output;
annotate, based on the matching, the extracted table structures; and
train, based on the annotated extracted table structures, the second machine learning model.

19. The computer program product of claim 15, wherein the first machine learning model is selected from the group consisting of a neural network and a support vector machine.

20. The computer program product of claim 15, wherein the second machine learning model is selected from the group consisting of a neural network and a support vector machine.

* * * * *